MOBILE RADIO STATIONS INTERCONNECTED WITH A WIRE TELEPHONE SYSTEM

Filed April 13, 1960 3 Sheets-Sheet 1

INVENTOR
GUSTAV RAGNAR BERGLUND
BY Hane and Nydick
ATTORNEYS

INVENTOR
GUSTAV RAGNAR BERGLUND
BY Hane and Nydick
ATTORNEYS

Sept. 24, 1963 G. R. BERGLUND 3,105,118

MOBILE RADIO STATIONS INTERCONNECTED WITH A WIRE TELEPHONE SYSTEM

Filed April 13, 1960 3 Sheets-Sheet 3

INVENTOR
GUSTAV RAGNAR BERGLUND
BY Hane and Nydick
ATTORNEYS

United States Patent Office 3,105,118

Patented Sept. 24, 1963

3,105,118
MOBILE RADIO STATIONS INTERCONNECTED WITH A WIRE TELEPHONE SYSTEM

Gustav Ragnar Berglund, Farsta, Sweden, assignor to Telefonaktiebolaget L M Ericsson, Stockholm, Sweden, a corporation of Sweden Filed Apr. 13, 1960, Ser. No. 21,952
5 Claims. (Cl. 179—41)

Figure 1:
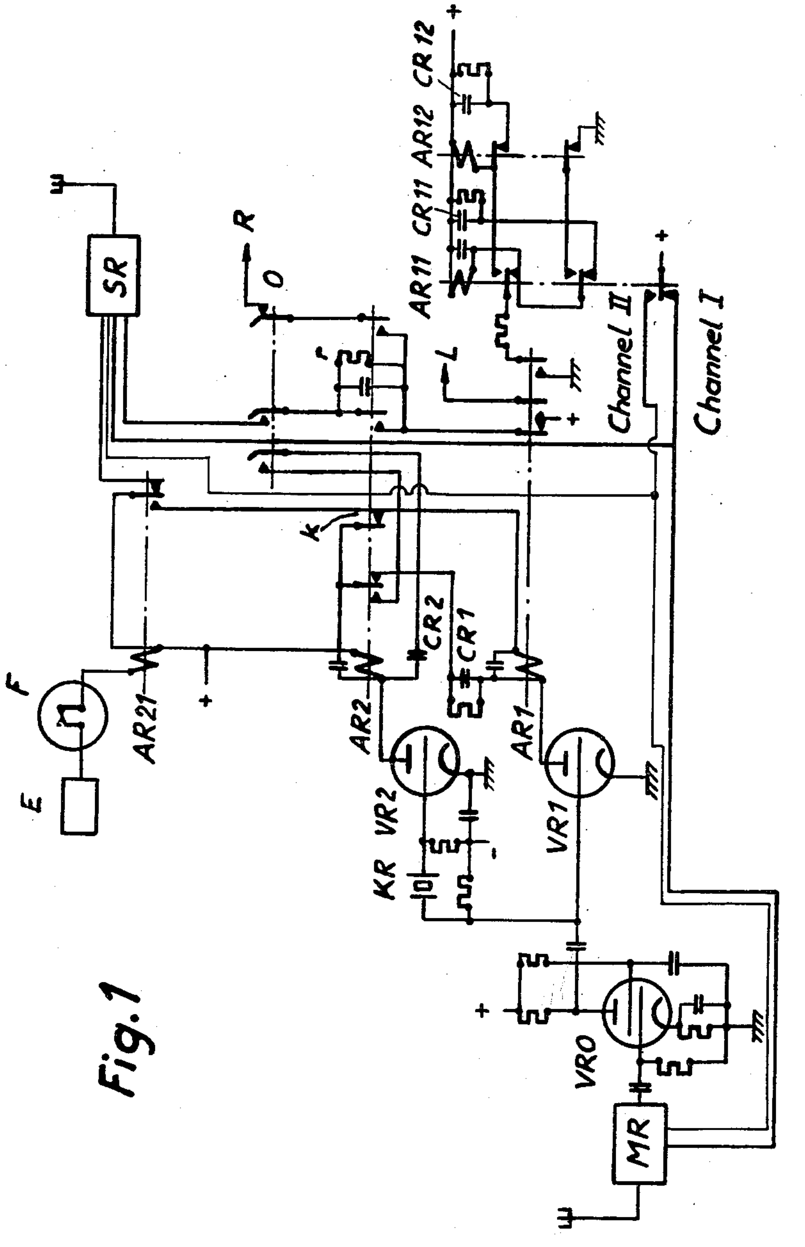

The present invention refers to a radio telecommunication system that renders possible the automatic establishment of communications between mobile radio stations and between these stations and subscribers of a wire telephone system through one or several stationary radio stations. The invention is applicable especially to such radio telecommunication systems that include a plurality of mobile radio stations and at least one stationary radio station intercommunicated with a wire telephone system and equipped with radio receivers with such a high amplification that they produce noise when no carrier wave is received, and at which system duplex or two-way radio communications may be established between anyone of the mobile radio stations and any subscriber of the wire telephone system through the stationary radio station or stations as well as between any two mobile radio stations through the stationary radio station or stations and the wire telephone system. In such a system a group of duplex radio channels (frequency pairs) common to a predetermined group of mobile radio stations is provided as well as a separate radio transmitter and a separate radio receiver corresponding to each one of these duplex radio channels in the stationary radio station or stations, each one of said duplex radio channels being used only for one duplex communication at a time. The system admits an effective use of available radio frequencies.

One object of the invention is to provide a telecommunication system with a plurality of mobile radio stations, where to each mobile radio station is assigned an individual identification signal that is transmitted to and from the mobile radio station during the establishment of a connection as well as during conversation. For each group of duplex radio channels the equipment of the stationary radio station is provided with a common channel allotter, comprising relays, the contacts of which are so interconnected that they successively and in a predetermined order, by means of a noise suppressor circuit, prevent the stationary receivers one at a time from transmitting noise to their transmitters. When a connection is established on such a noiseless channel, the noise suppressor of the receiver of this channel in the stationary station is put out of function by the identification signal transmitted by the mobile transmitter to said receiver, as this signal operates a relay in the channel allotter. Hereby the stationary receiver of the next idle channel is prevented from transmitting noise and so on, whereby at any moment one channel is free from both identification signal and noise (idle-marked channel).

Another object of the invention is to provide in the equipment of each mobile station and in the individual equipment, corresponding to said station in the stationary station equipment, a channel finding device, including relays operable by noise or by identification tones of other mobile stations, the contacts of which relays are so interconnected, that they successively and in a predetermined order effectuate a channel change for the mobile station and for the corresponding equipment in the stationary station, until the idle-marked channel—a channel free from noise as well as from identifying signals—is encountered, whereby all idle mobile radio stations of the group and the corresponding stationary equipment are kept connected to an idle-marked channel of the group in order to facilitate the establishment of a connection in either traffic direction.

A further object of the invention is to provide in the equipment of each mobile radio station and the corresponding individual equipment in the stationary station a relay circuit that is actuable only by the individual identification signal of said mobile station, which relay circuit by opening or closing of a contact prevents channel change at the reception of said individual identification signal of the mobile station, whereby a established connection is retained on a selected channel.

A characteristic identification tone or tone combination is thus assigned to each mobile station, said identification tone being transmitted only by the equipment of the mobile station, and by its corresponding stationary line equipment connected between the stationary radio station and the wire telephone system. By means of said stationary line equipment the mobile radio station is connected to a special subscriber's line of the telephone exchange an individual telephone line being assigned to each mobile radio station. As the identification tones are transmitted even during conversation, they are suitably located above the voice frequency band in order not to disturb the conversation, e.g. round the frequency of 10,000 cycles/second. With a tone frequency separation of 20 cycles/second space is obtained for 50 tones within a 1 kilocycle/second band, whereby single tone signals will give 50, and double tone signals 1225 combinations.

While a mobile radio station by means of such an identification tone or tone combination is connected to its corresponding line through a duplex radio channel, this same identification tone or tone combination prevents as well the use of the channel by other mobile stations by changing said stations to another channel.

In the case that the two mobile stations should simultaneously originate a call on the same channel, they cannot both be connected to the system through this channel. Provided the field force of one of the mobile stations is greater than that of the other at the receiving antenna of the stationary radio station, the stronger signal will—at the FM-system supposed to be used—suppress the weaker signal when passing the stationary receiver, whereby only one of the stations is connected to the channel and the other is switched over to the next idle channel allotted. If the signals are equally strong, none of the stations is connected, and the calls will have to be repeated.

In the drawings an embodiment of the invention is shown, comprising two duplex channels, using single tone identification signals, and arranged for connection to an automatic telephone system. FIG. 1 shows the equipment of a mobile radio station, FIG. 2 the individual stationary line equipment corresponding to said mobile station, and FIG. 3 the equipment common to all mobile stations in the stationary radio station.

In the mobile station according to FIG. 1, a receiver MR and a transmitter SR are used, which both are of the types commonly used in mobile radio stations. A relay AR1 is operated by identification tones or noise that, coming from the receiver MR, is amplified by a tube VR0 and rectified by a tube VR1. Furthermore a relay AR2 may be operated only by the proper identification tone, corresponding to the individual station, because of the series resonance of a crystal KR, which tone, generated by an oscillator E, may be transmitted by the transmitter SR and retransmitted by the stationary radio station and finally received by the receiver MR. The relays AR11 and AR12 are slow acting and operate alternately in a circuit from ground on the make contact of the relay AR1 to the common positive. When the relay AR1 is operated the first time, AR11 is operated and changes the positive from the contact corresponding to channel I to the contact corresponding to channel II. Thereby the transmitter and the receiver are changed from channel I to channel II. When the latter channel II is idle-marked, i.e., noise or identifications signals are not received in this channel, the relay AR1 will release immediately and AR11 will remain activated because relay AR12 does not have sufficient time to become activated. The next time AR1 is activated, the relay AR12 will be activated in a circuit from the same ground on the contact of relay AR1 through the upper make contact on relay AR11 to positive. The holding of relay AR11 is interrupted by the break contact of AR12, whereby AR11 releases changing the positive back to channel I. While the relay AR1 in this manner causes change of duplex channel, the object of the relay AR2 is to prevent, when the proper identification signal is received, by means of a break contact the relay AR1 from changing duplex channel and either to give by means of a make contact a ringing signal on a ringer R or, in case a switch 0 is actuated, by means of another contact maintain the transmitter SR in operating condition. Operation of the transmitter SR cannot be effected when relay AR1 is operated and the relay AR1 cannot be operated when the station's own identification tone is received, as the relay AR2 in this case operates and opens the contact $k$. For this purpose the condenser CR1 is given such a size, that the relay AR1 does not have time to operate before the contact $k$ opens at the operation of the relay AR2, and that the relay AR1, when operated by another tone, does not release at short interruptions (dial pulses) of this tone (approximately 0.1 sec. operate respectively release time). A condenser CR2 in connected in parallel with the relay AR1 and given such a size, that this relay has a release time of about 1 sec. The condensers CR11 and CR12, connected in parallel with the relays AR11 and AR12 respectively, are so chosen that these relays have an operate time of about 1 second. A lamp L indicates occupied duplex channel. Dial pulses may be sent by means of a dial F and the relay AR21, and if the lamp flickers during the dialing due to the relay AR21 transmitting intermittent positive pulses of inadeqaute break-make relation to the relay AR1, the channel is indicated to be defective, so that the dial pulses cannot be expected to arrive correctly to the telephone exchange.

The stationary individual equipment (FIG. 2), provided for each mobile station in the stationary radio station, is in principle designed in the same manner as the equipment of the mobile station. Relays AJ21 and AJ1 are operated by any tone received and the relay AJ2 only by the individual identification tone, thereby connecting the corresponding subscriber's line to the selected duplex radio channel through the transformer T. A ringing relay AJ0 is provided, that may be operated by ringing signals from the telephone exchange, said relay in operated position connecting by its make contact to the selected channel an oscillator D that generates the identification frequency of the mobile station. The ringing signals are thus transmitted to the mobile station by the transmitter of the channel. A break contact of the relay AJ0 prevents the relays AJ1 and AJ2 from operating during the ringing signals. Furthermore the relay AJ21 serves as a pulse repeating relay, when dial pulses from the mobile station, consisting of interruptions of the identification tone, are received. In order to make said relay quick-releasing it is provided with an extra winding that is counteracting to the operating winding.

In the common equipment (FIG. 3) of the stationary radio station, comprising the constantly operated transmitters SI and SII and receivers MI and MII of ordinarily used types, relays AI1 and AII1 are operated only by identification tones, amplified respectively in the tubes VI0 and VII0, and rectified respectively by the tubes VI1 and VII1. Due to the provision of the relays AI1, AI2, AII1 and AII2 only one of the channels is idle-marked (the channel is then free from identification tone). The idle-marking is effected by connecting a noise suppressor circuit to the receiver of the channel, i.e. the low frequency amplifier of said receiver is blocked in the known way as long as no signal enters. A positive potential is applied through the contact $b$ (or $c$) of the relay AI2 and through relay contacts $e$ on relay AI1 (or $g$ on relay AII1 respectively).

The size of the condensers CI and CII are so chosen, that the operate and release times of the relays AI1 and AII1 are about 1 second.

Figure 2:
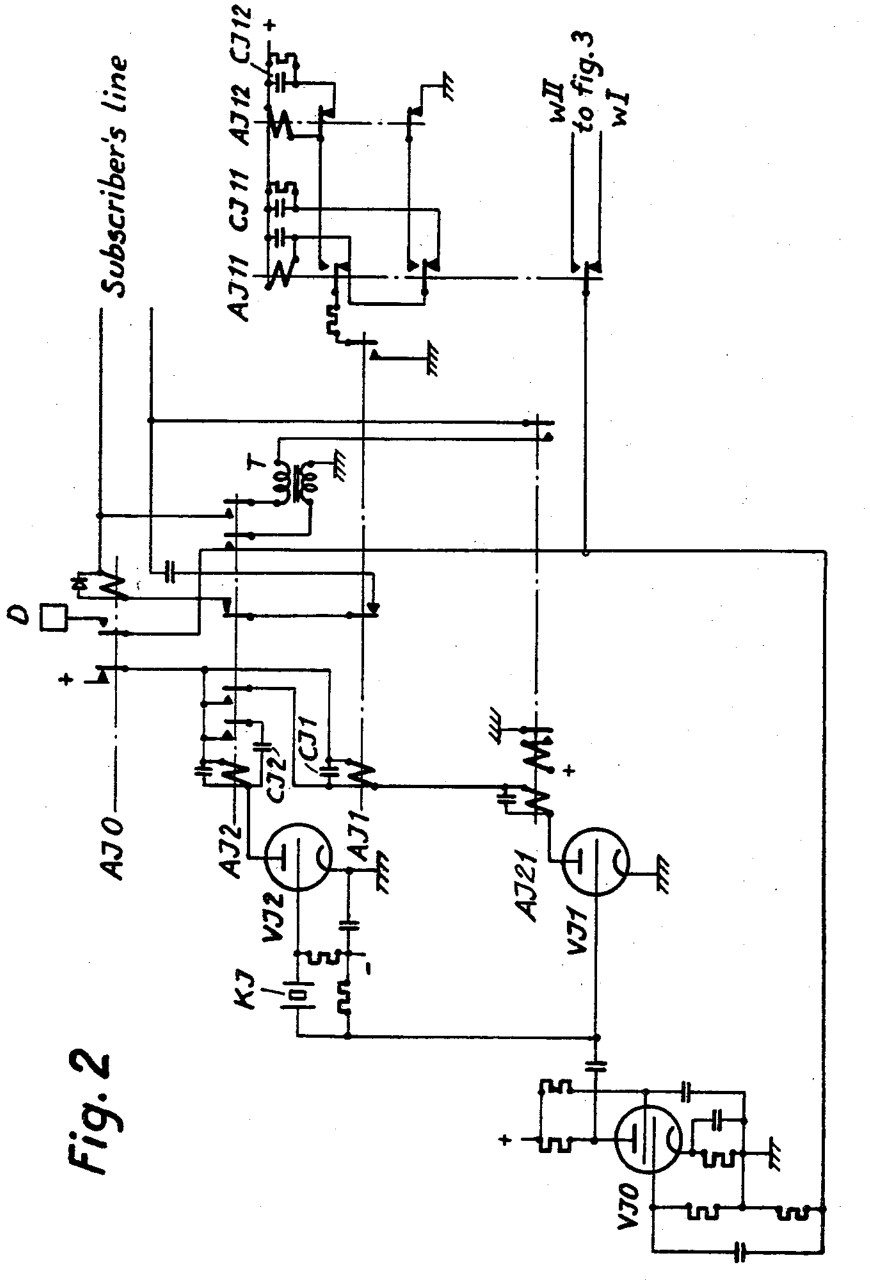
Figure 3:
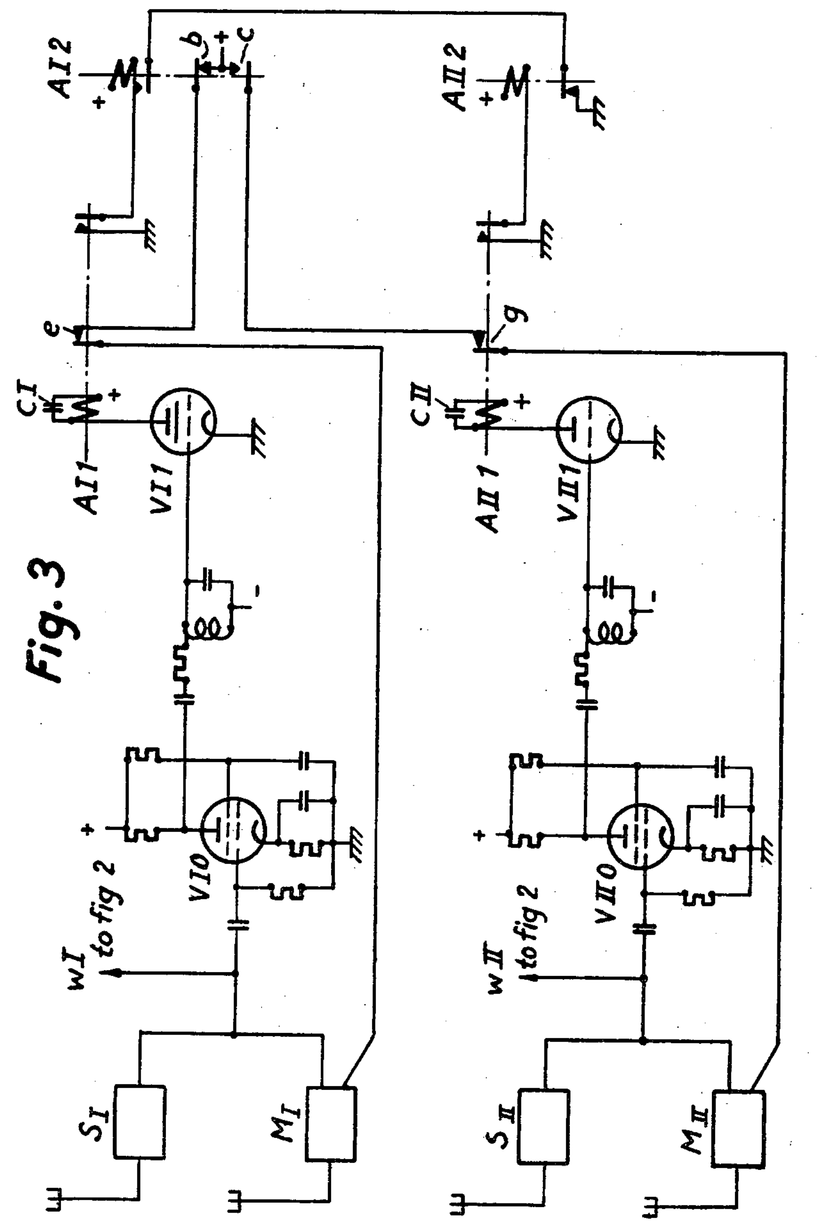

The establishment of a connection of a mobile radio station to its corresponding subscriber's line on the stationary radio station is effected in the following manner. It is supposed, as shown in the figures, that channel I is idle, i.e. that the noise suppressor circuit is connected to the receiver MI of the duplex channel I in the stationary radio station by a positive potential being applied to an electrode of a tube in said receiver. Furthermore, it is supposed that duplex channel II is not taken, so that the receiver MII of the same is producing noise. All the mobile radio stations and their individual stationary equipments in the stationary radio station are, therefore, connected to duplex channel I, the sender of which because of the noise suppressor transmits a noise- and toneless carrier wave. The switch 0 of a mobile radio station (FIG. 1) is now actuated (that is, a handset, not shown, is lifted) in order to operate the transmitter SR of the station. The transmitter SR is operated by positive on a relay contact of the relay ARI, that is not operated, through a resistance $r$ and a contact on the switch 0. When the identification tone, normally transmitted by the transmitter SR, when operated, is received by the receiver MI of the stationary radio station, retransmitted by the transmitter SI, and finally received by the receiver MR of the mobile station, the relay AR2 is operated thus retaining the transmitter SR in transmitting condition by opening the contact $k$, whereby the relay AR1 is prevented from operating. Furthermore, the identification tone, received by the receiver MI of the stationary radio station, operates the relays AJ2 and AJ21 in the individual equipment of the mobile station through the wire $w$I (FIGS. 3 and 2), so that the loop of the corresponding subscriber's line on the telephone exchange is closed and this line is connected to the mobile station by means of the transformer T (FIG. 2). In all other mobile radio stations and in their corresponding individual equipment of the stationary radio station the relays AR1 and AJ1 respectively are operated by the identification tone, which, however, does not operate the relays AR2 and AJ2, because the crystals KR and KJ do not have series resonance for this identification tone, so that switching of these stations to duplex channel II will be effectuated in the way described in relation to FIG. 1. This channel II is thereby idle-marked, because said identification tone operates the relays AI1 and AI2 in the common equipment, which at the contacts $b$ and $e$ disconnects the wire suppressor circuit from channel I and through contacts $c$ and $g$ connects it to channel II. When dialing tone from the telephone exchange is received in the mobile station, the desired number is taken on the dial F in the mobile station observing the lamp L (FIG. 1). After a terminated conversation the mobile station is automatically switched over to the idle-marked channel II, because the mobile station transmitter SR ceases transmitting the identification tone, which in turn causes the relay AR2 to release and AR1 to operate, which latter relay, according to the description given above, causes a channel change. The corresponding course of events will take place in the individual stationary equipment corresponding to the mobile station.

I claim:

1. A radio system for duplex communication between stationary telephones and mobile radio stations, each of said mobile stations having associated therewith corresponding subscriber lines and line equipment in a telephone central office, the system comprising at least one stationary radio station with a plurality of communication channels, transmitter and receiver means associated with each of said communication channels for communication on a pair of assigned carrier frequencies, said receiver means of said stationary station having high amplification to generate noise signals in the absence of received carrier frequencies and circuits for feeding said noise signals to the associated transmitter means thereof for transmitting said noise signals in each of said channels, respectively, each of said mobile stations having a plurality of corresponding communication channels, said plurality of communication channels of said stationary station serving a plurality of subscriber lines and said mobile station channels, said mobile stations including transmitting and receiving means associated with each of said communication channels for transmitting and receiving said carrier frequencies and said noise signals, each of said mobile stations having generating means for generating a separate signal for identification of said mobile stations and circuits for transmitting said identification signals, said receiver means of said stationary station being responsive to said transmitted identification signals and said transmitter means of said stationary station being responsive to received identification signals for retransmitting said identification signals, a circuit in said stationary station for suppressing noise signals generated in one communication channel at a time in the absence of received signals in said communication channels, each of said mobile stations and each of said corresponding subscriber's equipment having first means responsive to said retransmitted identification signals, second means responsive to said noise signals and to said identification signals of all of said mobile stations, and means operated by said first means to prevent said second means from being activated when said retransmitted identification signals are received, each of said mobile stations and each of said corresponding subscriber's equipment having a channel allotter circuit responsive to said second means for selecting a communication channel of said mobile stations and of said subscriber's equipment which is free from said noise signals and said retransmitted identification signals, whereby all of said mobile stations are preset to an idle communication channel, said receiver means of said stationary station including means responsive to said identification signals for activating said suppression circuit to suppress said noise signals in another communication channel.

2. A radio system as set forth in claim 1, wherein each mobile station includes an audio frequency generator for generating an identification signal frequency and circuits for transmitting said identification signal frequency, and said stationary station and said receiver means of said mobile stations include means responsive to said identification signal frequency.

3. A radio system as set forth in claim 1, wherein said receiver means of said stationary station receives ringing signals from a telephone exchange on a subscriber's line corresponding to a mobile station and said transmitter means of said stationary station includes generating means for generating an identification signal frequency of said mobile station and circuits for transmitting said identification signal frequency during the ringing interval of said ringing signals.

4. A radio system as set forth in claim 1, wherein said transmitter means of said mobile stations and said receiver means of said stationary station are responsive to frequency modulated signals.

5. A radio system as set forth in claim 1, wherein said transmitter means of said mobile stations includes a dial connected to interrupt said identification signals for transmitting dialed pulses to said stationary station, said stationary station including relays adapted to repeat said received dialed pulses in the circuit of the subscriber lines.

References Cited in the file of this patent

FOREIGN PATENTS

| | | |
|---|---|---|
| 683,727 | Great Britain | Dec. 3, 1952 |
| 80,088 | Denmark | Nov. 7, 1955 |